United States Patent
Li et al.

(10) Patent No.: US 11,089,451 B2
(45) Date of Patent: Aug. 10, 2021

(54) AUTOMATIC INCIDENT DETECTION AND REPORTING

(71) Applicant: Beijing DiDi Infinity Technology and Development Co., Ltd., Beijing (CN)

(72) Inventors: Dong Li, Santa Clara, CA (US); Jing Chen, Palo Alto, CA (US)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 0 days.

(21) Appl. No.: 16/717,983

(22) Filed: Dec. 17, 2019

(65) Prior Publication Data

US 2021/0182998 A1    Jun. 17, 2021

(51) Int. Cl.
```
H04W 4/16      (2009.01)
G06Q 10/02     (2012.01)
H04W 4/029     (2018.01)
G06Q 50/30     (2012.01)
G01C 21/34     (2006.01)
H04L 29/08     (2006.01)
H04W 4/40      (2018.01)
G07C 5/00      (2006.01)
```

(52) U.S. Cl.
CPC .............. *H04W 4/16* (2013.01); *G06Q 10/02* (2013.01); *H04W 4/029* (2018.02); *G01C 21/3438* (2013.01); *G06Q 50/30* (2013.01); *G07C 5/008* (2013.01); *H04L 67/12* (2013.01); *H04W 4/40* (2018.02)

(58) Field of Classification Search
CPC ...... G06F 11/10; G06F 11/14; G06F 11/1451; G06F 11/1458; G06F 11/1471; G06Q 10/00; G06Q 10/02; G06Q 10/1095; H04W 4/026; H04W 4/029; H04W 4/16; H04W 4/44; H04R 1/10; H04R 1/1091
See application file for complete search history.

(56) References Cited

U.S. PATENT DOCUMENTS

| | | | |
|---|---|---|---|
| 2013/0150004 A1* | 6/2013 | Rosen | H04W 48/04 455/414.1 |
| 2014/0066089 A1 | 3/2014 | Monks et al. | |
| 2016/0212522 A1* | 7/2016 | Lee | B60W 50/14 |
| 2017/0039784 A1* | 2/2017 | Gelbart | G07C 5/00 |
| 2019/0378095 A1* | 12/2019 | Kim | G06Q 10/1095 |

FOREIGN PATENT DOCUMENTS

| | | |
|---|---|---|
| CN | 205050295 U | 2/2016 |
| CN | 106448045 A | 2/2017 |
| CN | 108040182 A | 5/2018 |
| CN | 108810101 A | 11/2018 |
| CN | 109584008 A | 4/2019 |

OTHER PUBLICATIONS

PCT International Search Report and the Written Opinion dated Mar. 18, 2021, issued in related International Application No. PCT/CN2020/136723 (9 pages).

* cited by examiner

*Primary Examiner* — Van T Trieu
(74) *Attorney, Agent, or Firm* — Sheppard Mullin Richter & Hampton LLP

(57) ABSTRACT

Incidents may be detected and reported based on changes in sensor data from a device. Trigger data from a trigger device in a vehicle may be received over a communication network. An incident report may be generated based on the trigger data. The incident report may comprise driver information of a driver of the vehicle. A user account of the driver in a ride sharing application may be blocked.

20 Claims, 6 Drawing Sheets

AUTOMATIC INCIDENT DETECTION AND REPORTING

TECHNICAL FIELD

The disclosure relates generally to detecting and reporting incidents in vehicles.

BACKGROUND

Under traditional approaches, ridesharing platforms may be able to connect passengers and drivers on relatively short notice. However, traditional ridesharing platforms suffer from a variety of safety and security risks for both passengers and drivers.

SUMMARY

A claimed solution rooted in computer technology overcomes problems specifically arising in the realm of computer technology. In various implementations, a computing system is configured to receive, over a communication network, trigger data from a trigger device in a vehicle; generate an incident report based on the trigger data, the incident report comprising driver information of a driver of the vehicle; and block a user account of the driver in a ride sharing application.

Another aspect of the present disclosure is directed to a method configured to receive, over a communication network, trigger data from a trigger device in a vehicle; generate an incident report based on the trigger data, the incident report comprising driver information of a driver of the vehicle; and block a user account of the driver in a ride sharing application.

Yet another aspect of the present disclosure is directed to a non-transitory computer-readable storage medium configured with instructions executable by one or more processors to cause the one or more processors to perform operations configured to receive, over a communication network, trigger data from a trigger device in a vehicle; generate an incident report based on the trigger data, the incident report comprising driver information of a driver of the vehicle; and block a user account of the driver in a ride sharing application.

In some embodiments, the trigger device may comprise a phone of the driver of the vehicle.

In some embodiments, the trigger data may comprise any of a phrase set by the driver or a phrase associated with a crime.

In some embodiments, the trigger data may comprise phone sensor data from the phone of the driver.

In some embodiments, generating an incident report based on the trigger data may comprise: comparing the phone sensor data to standard conditions; determining, in response to the comparison, that an incident has occurred; and generating the incident report for the incident.

In some embodiments, the trigger data may comprise an activation or deactivation of the trigger device.

In some embodiments, blocking the user account of the driver may prevent the driver from appearing to riders in the ride sharing application.

In some embodiments, it may be determined that a passenger was in the vehicle at a time at which the trigger data was obtained. A second user account of the passenger in the ride sharing application may be blocked.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve the safety and security of a ride sharing service. A large number of major incidents, such as a passenger robbing a driver, either never get reported, or are reported with a large delay. When the driver's phone is stolen, the driver cannot report the incident right away. The thief may steal from other drivers, or use the driver's phone to find other passengers. The earlier that an incident is detected, the earlier an action, such as blocking the user, may take place. Quickly detecting incidents may prevent additional incidents from occurring.

Figure 1:
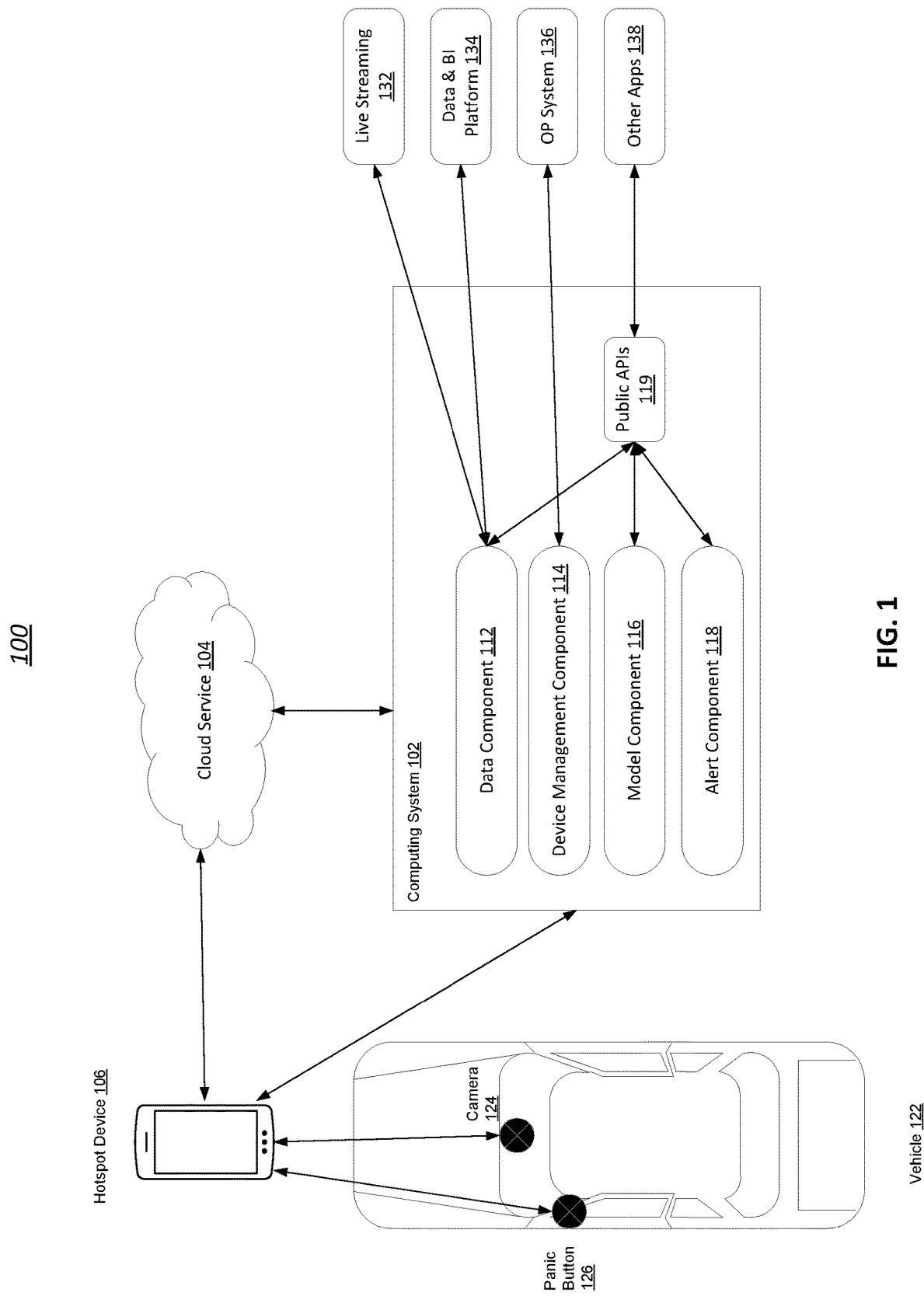
FIG. 1 illustrates an example environment for an in-car security system, in accordance with various embodiments of the disclosure.

FIG. 1 illustrates an example environment 100 for an in-car security system, in accordance with various embodiments. The example environment 100 may include a computing system 102, a cloud service 104, and a hotspot device 106. The computing system 102 may be implemented in one or more networks (e.g., enterprise networks), one or more endpoints, or one or more servers. The cloud service 104 may include a cluster of servers and other devices which are distributed across a network. The hotspot device 106 may be implemented on or as various devices such as a mobile phone, tablet, server, desktop computer, laptop computer, wearable device (e.g., smart watch, helmet camera), dash cam, vehicle (e.g., car, truck, boat, train, autonomous vehicle, electric scooter, electric bike), etc. The hotspot device 106 may connect to vehicle 122, camera 124, panic button 126, and other devices through one or more communication networks. For example, the hotspot device 106 may connect to other devices over the internet, through a local network (e.g., LAN), or through direct communication (e.g., Bluetooth, radio frequency, infrared). The hotspot device 106 may be part of the Internet of things (IoT). Although only a single camera 124 and panic button 126 are shown in FIG. 1, environment 100 may include multiple cameras and panic buttons. Cameras and panic buttons may be located in various locations both inside and outside of vehicle 122. The computing system 102 may communicate with the computing devices 104 and 106, and other computing devices. The computing system 102, the cloud service 104, and the hotspot device 106 may be connected through one or more communication networks, and may communicate using one or more communication protocols.

While the computing system 102, the cloud service 104, and the hotspot device 106 are shown in FIG. 1 as single entities, this is merely for ease of reference and is not meant to be limiting. One or more components or functionalities of the computing system 102, the cloud service 104, or the hotspot device 106 described herein may be implemented in a single computing device or multiple computing devices. For example, one or more components/functionalities of the computing system 102 may be implemented in the cloud service 104, the hotspot device 106, or distributed across multiple computing devices.

The computing system 102, the cloud service 104, and the hotspot device 106 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and memory (e.g., permanent memory, temporary memory). The processor(s) may be configured to perform various operations by interpreting machine-readable instructions stored in the memory. The computing system 102, the cloud service 104, and the hotspot device 106 may include other computing resources. In some implementations, the computing system 102 and the hotspot device 106 may comprise a single self-contained hardware device configured to be communicatively coupled or physically attached to a component of a computer system. In some implementations, the computing system 102 and the hotspot device 106 may include an application specific integrated circuit (ASIC) or a field-programmable gate array (FPGA) configured to perform transaction verification operations associated with one or more decentralized applications. The computing system 102, the cloud service 104, and the hotspot device 106 may be installed with appropriate software (e.g., platform program, etc.) and/or hardware (e.g., wires, wireless connections, etc.) to access other devices of the environment 100. The computing system 102 may include a data component 112, a device management component 114, a model component 116, an alert component 118, and public APIs 119. The public APIs 119 may be configured to allow the other components of computing system 102 to communicate with other applications (apps) 138. The computing system 102 may include other components.

The data component 112 may be configured to receive trigger data over a communication network in response to activation of a trigger device disposed within a first area of a vehicle. In some embodiments, the data component 112 may be configured to receive trigger data from a trigger device in a vehicle. In some embodiments, the vehicle may include vehicle 122. Vehicle 122 may include a car, truck, boat, train, or autonomous vehicle. In some embodiments, vehicle 122 may be a vehicle used for ride sharing. In some embodiments, the communication network may include the hotspot device 106. In some embodiments, the hotspot device 106 may include a mobile device of a driver of the vehicle. In some embodiments, the hotspot device 106 may be configured to generate a hotspot. In some embodiments, the hotspot device 106 may include the vehicle 122. In some embodiments, the hotspot device 106 may include a video streaming device. In some embodiments, the communication network may include cloud service 104. In some embodiments, the communication network may include computing system 102.

In some embodiments, the trigger device may include panic button 126. In some embodiments, activation of the trigger device may include the driver activating the panic button 126. In some embodiments, the trigger data may include information indicating that an incident is in progress or has already occurred. In some embodiments, the trigger device may include a mechanical button or switch. In some embodiments, the panic button 126 may connect to the hotspot device 106. In some embodiments, the first area of the vehicle may include an area that is not visible to the passenger of the vehicle. For example, the first area may be located under the driver's seat, or behind the steering wheel. In some embodiments, the trigger data may include an indication that a driver of the vehicle is distressed.

In some embodiments, the trigger device may comprise a phone of a driver of a vehicle. For example, the phone of the driver may include hotspot device 106. In some embodiments, the trigger data may comprise suspicious event data indicating that an incident may be occurring. In some embodiments, the trigger data may comprise a phrase spoken by the driver. In some embodiments, the phrase may be set by the driver. For example, the driver may set the phrase to be "Would you like some spearmint candy?" This may allow activation of the trigger device without alerting passengers in the vehicle. In some embodiments, the phrase may be stored with the driver's profile. In some embodiments, the phrase may be associated with a crime. For example, "Take everything, but please don't hurt me!" In some embodiments, activation of the trigger device may include recognizing the phrase. In some embodiments, the phrase can be detected by hotspot device 106. In some embodiments, the phrase my be recognized using speech analysis. In some embodiments, speech analysis may be performed at hotspot device 106, at cloud service 104, or at computing device 102. For example, speech analysis may be performed using software development kits (SDKs) on hotspot device 106.

In some embodiments, the trigger data may include phone sensor data from the phone of the driver (e.g., hotspot device 106). In some embodiments, phone sensor data may include acceleration data. In some embodiments, phone sensor data may include movement data. In some embodiments, phone sensor data may include orientation data. Acceleration data, movement data, and orientation data may be detected using an accelerometer or a gyroscope. In some embodiments, phone sensor data may include proximity data. Proximity data may be obtained from a proximity sensor. In some embodiments, phone sensor data may include a power status of the phone (e.g., on, off, sleep). In some embodiments, phone sensor data may include lighting data. Lighting data may be obtained from a light sensor.

In some embodiments, the data component 112 may be configured to obtain sensor information from other devices in vehicle 122. In some embodiments, the data component 112 may obtain image data from camera 124. Camera 124 may be located in vehicle 122. In some embodiments, camera 124 may be connected to hotspot device 106. In some embodiments, camera 124 may be integrated into hotspot device 106.

Sensor information captured by the camera may include still images, a video recording, or a live stream of image data. In some embodiments, data component 112 may connect with live stream 132. Live stream 132 may include a service or application located internally or externally to computing system 102. In some embodiments, multiple still images may be captured during a trip. In some embodiments, camera 124 may include a wide angle lens. In some embodiments, camera 124 may include night vision. Tradeoff may be considered when the data component 112 obtains sensor information. Factors considered in the tradeoff may include power consumption, data consumption, and image or video quality. In some embodiments, passengers using the rider sharing service may be given the option to pick vehicles with cameras. For example, vehicles with cameras may have a higher cost.

In some embodiments, the data component 112 may obtain audio (e.g., voice) data from a microphone. The microphone may be included in hotspot device 106, camera 124, or vehicle 122. In some embodiments, the sensor information may include information which may be used to identify the driver and the passengers in vehicle 112. For example, image data may include a face of the driver or a face of the passengers. Voice data may be used to identify the driver or the passengers. In some embodiments, data component 112 may connect to data and business intelligence (BI) platform 134. Data and BI platform 134 may perform data processing (e.g., image processing, video processing, audio processing). In some embodiments, a buffer of sensor data may be maintained. The buffer may update continuously before panic button 126 is activated. The data component 112 may be configured to obtain the buffer of sensor after the trigger data is obtained. For example, a buffer may be stored in hotspot device 106, and transmitted to data component 112 after activation of panic button 126.

The device management component 114 may be configured to control devices in vehicle 122. For example, the device management component 114 may control hotspot device 106, camera 124, or any other device connected to hotspot device 106. In some embodiments, the device management component 114 may connect to operating (OP) system 136. OP system 136 may interface between hardware and software components. In some embodiments, the device management component 114 may control a camera disposed within a second area of a vehicle over a communication network in response to receiving trigger data. For example, the device management component 114 may control camera 124 to perform real-time monitoring in response to the driver pushing panic button 126. This may reduce the processing time of an incident. In some embodiments, the device management component 114 may cause the camera to capture sensor information of a passenger of the vehicle.

In some embodiments, controlling the camera may comprise switching the camera from a powered-off state to a powered-on state. This may allow the camera to not record all the time and resources (e.g., battery life, network data). In some embodiments, controlling the camera may comprise causing the camera to live-stream the sensor information of the passenger of the vehicle. In some embodiments, controlling the camera may comprise adjusting a zoom level of the camera. For example, the camera may zoom in or zoom out using either digital or optical zoom. Zooming out may allow a broader field of view to be captured. For example, the camera may need to zoom out to capture image data of multiple passengers. Digitally zooming in may allow a smaller amount of data to be transmitted through hotspot device 106. In some embodiments, controlling the camera may comprise changing the direction the camera is facing. In some embodiments, the device management component 114 may cause the camera to capture sensor information of a driver of the vehicle. In some embodiments, the second area of the vehicle may comprise an area of the vehicle that is visible to the passenger of the vehicle and a driver of the vehicle. In some embodiments, controlling the camera may occur autonomously. In some embodiments, controlling the camera may include providing instructions to the driver. For example, the instruction may include telling the driver to shift the camera to the left.

In some embodiments, the device management component 114 may control hotspot device 106, vehicle 122, or camera 124 to broadcast an audio message. The audio message may include a greeting message and a warning message. For example, once a trip is started a voice message could be broadcasted, such as a thanks for choosing the transportation service. In some embodiments, a warning message may warn passengers that a camera is on board. In some embodiments, the audio message may provide the driver with instructions for handling the incident. In some embodiments, the warning message may be broadcast in response to the activation of the trigger device. The broadcast audio message may deter incidents and improve the safety experience for both the driver and the passenger. In some embodiments, the device management component 114 may control hotspot device 106, vehicle 122, or camera 124 to capture audio data. For example, a two way communication channel may be opened.

The model component 116 may be configured to obtaining passenger information of the passenger of the vehicle in response to receiving the trigger data. In some embodiments, the passenger information may comprise a name and/or an address of the passenger. In some embodiments, the passenger information may be obtained based on user account information of the passenger. In some embodiments, the passenger information may be obtained based on a voice recognition analysis of the sensor information. In some embodiments, the passenger information may be obtained based on a facial recognition analysis of the sensor information. For example, photos may be stored in a database with user accounts, and the captured sensor information may be compared to the stored photos to identify the passenger. In some embodiments, the model component 116 may obtain facial recognition results from a facial recognition service. For example, the facial recognition service may be included in other apps 138. The model component 116 may utilize APIs 119 to connect with the facial recognition service.

The alert component 118 may be configured to generate an alert notification. The alert notification may comprise at least a portion of the sensor information of the passenger. The alert notification may be capable of initiating one or more incident actions associated with the passenger. In some embodiments, the one or more incident actions may comprise any of suspending or canceling a user account of the passenger. In some embodiments, sensor information and passenger information may be stored as evidence. For example, the evidence may include images of the passenger and driver. In some embodiments, the sensor information may be used to identify false accusations. For example, when an argument occurs between the driver and the passenger over price, the passenger may make false accusations of harassment or assault. The sensor information including the verbal argument over price may be stored as evidence of what actually happened. In some embodiments, evidence may be provided to the police. For example, voice records and photos of the passengers may be provided to the police to help identify fugitives. In some embodiments, the sensor information may be used to identify traffic accidents.

The alert component 118 may be configured to generate an incident report based on the trigger data. In some embodiments, the incident report may comprise driver information of a driver of the vehicle. In some embodiments, the trigger data may comprise an activation or deactivation of the trigger device. In some embodiments, activation of the trigger device may include detecting a change in the sensor information. In some embodiments, the change in the sensor information may be determined by comparing the current sensor information to standard sensor information. In some embodiments, the current sensor information may include phone sensor data from the phone of the driver. In some embodiments, the standard sensor information may include standard conditions. In some embodiment, the trigger data may include a result of the comparison. For example, the trigger data may include an indication that the variance between the current sensor information and the standard sensor information is greater than a threshold amount.

In some embodiments, generating the incident report based on the trigger data may comprise comparing phone sensor data from the phone of the driver to standard conditions. For example, standard conditions may include remaining mostly level, a constant light sensor reading, a distant reading from a proximity sensor, the phone being plugged in and charging, and a high battery level. In some embodiments, the standard sensor information may include the phone remaining level throughout the duration of a trip. In some embodiments, the standard sensor information may include the phone remaining plugged in throughout the duration of a trip. In some embodiments, the standard sensor information may include detecting a high amount of light by the light sensor. Abnormal phone sensor data may include a rapid change in orientation, a change to a low light level, a reduction in the distance reading from the proximity sensor, and the phone becoming unplugged during a trip.

In some embodiments, the alert component 118 may determine that an incident has occurred in response to the comparison of the phone sensor data to standard conditions. For example, the comparison may indicate that the driver's phone has been grabbed by the passenger, and the passenger has put the driver's phone in their pocket. In some embodiments, an incident report may be generated for the incident. In some embodiments, it may be determined that the phone of the driver has been grabbed based on the acceleration data. The trigger data may include an indication that the phone has been grabbed. In some embodiments, it may be determined whether the phone of the driver is inside a pocket using the proximity data. In some embodiments, the alert component 118 may filter out false alert notifications using trip status information. For example, if a driver continues to a destination, it may be determined that the trigger data is a false positive.

In some embodiments, the alert component 118 may be configured to block a user account of the driver in a ride sharing application. In some embodiments, blocking the user account of the driver may prevents the driver from appearing to riders in the ride sharing application. Blocking the user account of the driver may prevent the passenger from using the driver's account to commit additional crimes. In some embodiments, alert component 118 may determine that a passenger was in the vehicle at a time at which the trigger data was obtained. In some embodiments, a second user account of the passenger may be blocked in the ride sharing application.

Figure 2:
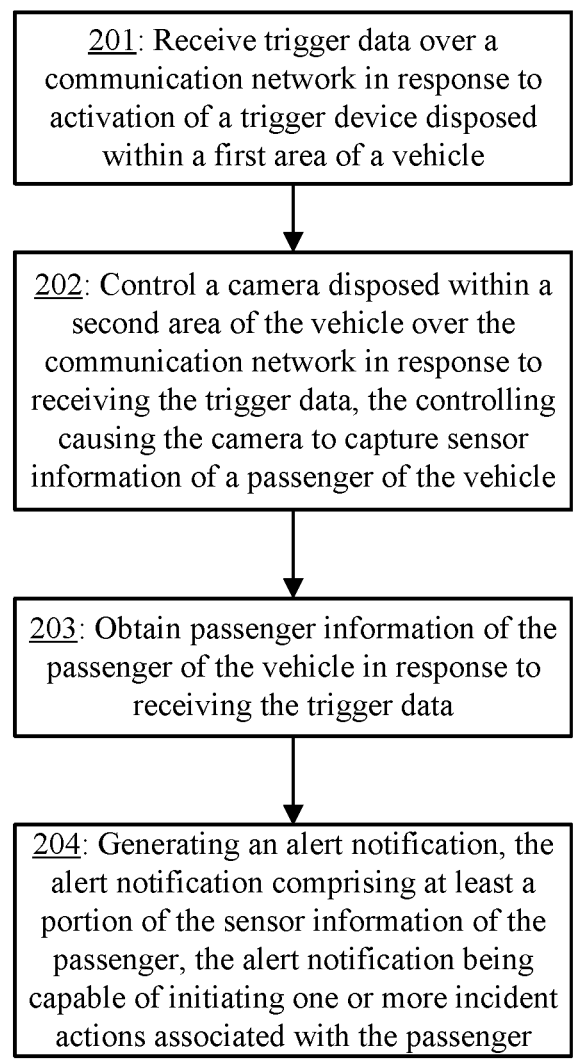
FIG. 2 illustrates a flowchart of an example method for monitoring an incident, in accordance with various embodiments of the disclosure.

FIG. 2 illustrates a flowchart of an example method 200 for monitoring an incident, according to various embodiments of the present disclosure. The method 200 may be implemented in various environments including, for example, the environment 100 of FIG. 1. The operations of the method 200 presented below are intended to be illustrative. Depending on the implementation, the method 200 may include additional, fewer, or alternative steps performed in various orders or in parallel. The method 200 may be implemented in various computing systems or devices including one or more processors.

With respect to the method 200, at block 201, trigger data may be received over a communication network in response to activation of a trigger device disposed within a first area of a vehicle. At block 202, a camera disposed within a second area of the vehicle may be controlled over the communication network in response to receiving the trigger data, the controlling causing the camera to capture sensor information of a passenger of the vehicle. At block 203, passenger information of the passenger of the vehicle may be obtained in response to receiving the trigger data. At block 204, an alert notification may be generated. The alert notification may comprise at least a portion of the sensor information of the passenger, and the alert notification may be capable of initiating one or more incident actions associated with the passenger.

Figure 3:
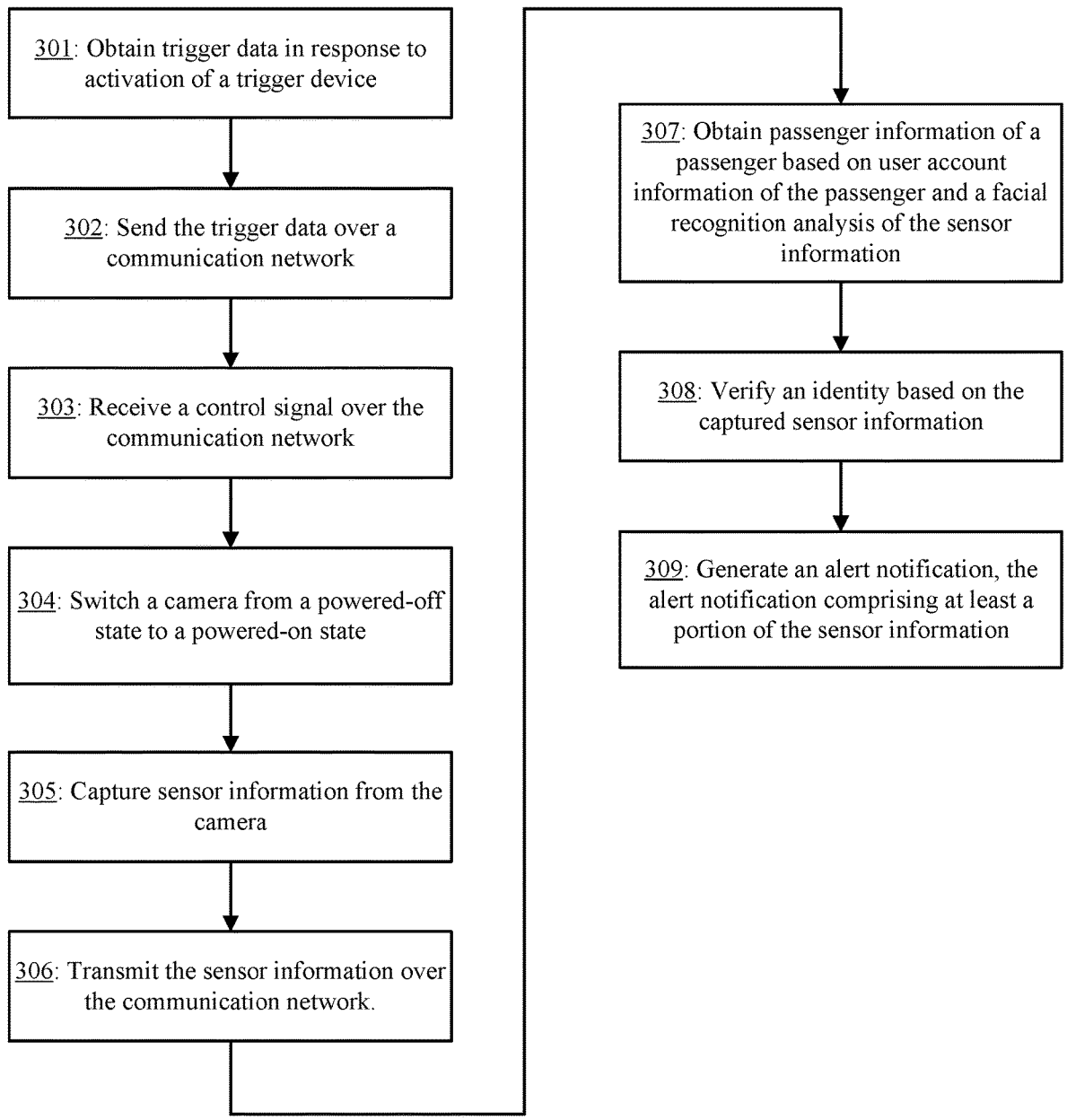
FIG. 3 illustrates a flowchart of an example method for monitoring an incident, in accordance with various embodiments of the disclosure.

FIG. 3 illustrates a flowchart of an example method 300 for monitoring an incident, according to various embodiments of the present disclosure. The method 300 may be implemented in various environments including, for example, the environment 100 of FIG. 1. The operations of the method 300 presented below are intended to be illustrative. Depending on the implementation, the method 300 may include additional, fewer, or alternative steps performed in various orders or in parallel. The method 300 may be implemented in various computing systems or devices including one or more processors.

With respect to the method 300, at block 301, trigger data may be obtained in response to activation of a trigger device. At block 302, the trigger data may be sent over a communication network. In some embodiments, the communication network may comprise a hotspot of a mobile device of a driver of the vehicle. At block 303, a control signal may be received over the communication network. At block 304, the camera may be switched from a powered-off state to a powered-on state. In some embodiments, the camera may be switched on in response to receiving the control signal. At block 305, sensor information may be captured from the camera. In some embodiments, the sensor information may include one or more of the driver and the passenger of the vehicle. At block 306, the sensor information may be transmitted over the communication network. For example, The transmission may include a live-stream. At block 307, passenger information of a passenger may be obtained based on user account information of the passenger and a facial recognition analysis of the sensor information. At block 308, an identity may be verified based on the captured sensor information. For example, the identity of the driver may be verified. At block 309, an alert notification may be generated. The alert notification may comprise at least a portion of the sensor information. In some embodiments, one or more incident actions associated with the passenger may be initiated in response to the alert notification. For example, a user account of the passenger may be suspended or canceled.

Figure 4:
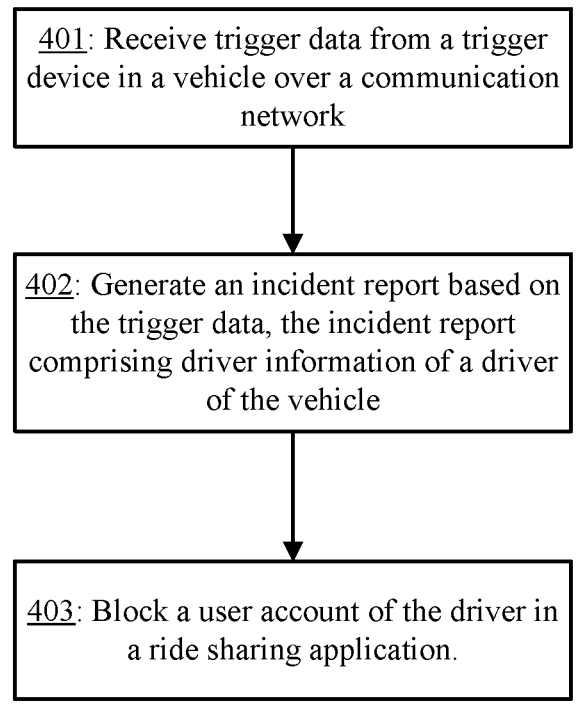
FIG. 4 illustrates a flowchart of an example method for detecting an incident, according to various embodiments of the present disclosure.

FIG. 4 illustrates a flowchart of an example method 400 for detecting an incident, according to various embodiments of the present disclosure. The method 400 may be implemented in various environments including, for example, the environment 100 of FIG. 1. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 401, trigger data from a trigger device in a vehicle may be received over a communication network. At block 402, an incident report may be generated based on the trigger data. The incident report may comprise driver information of a driver of the vehicle. At block 403, a user account of the driver in a ride sharing application may be blocked.

Figure 5:
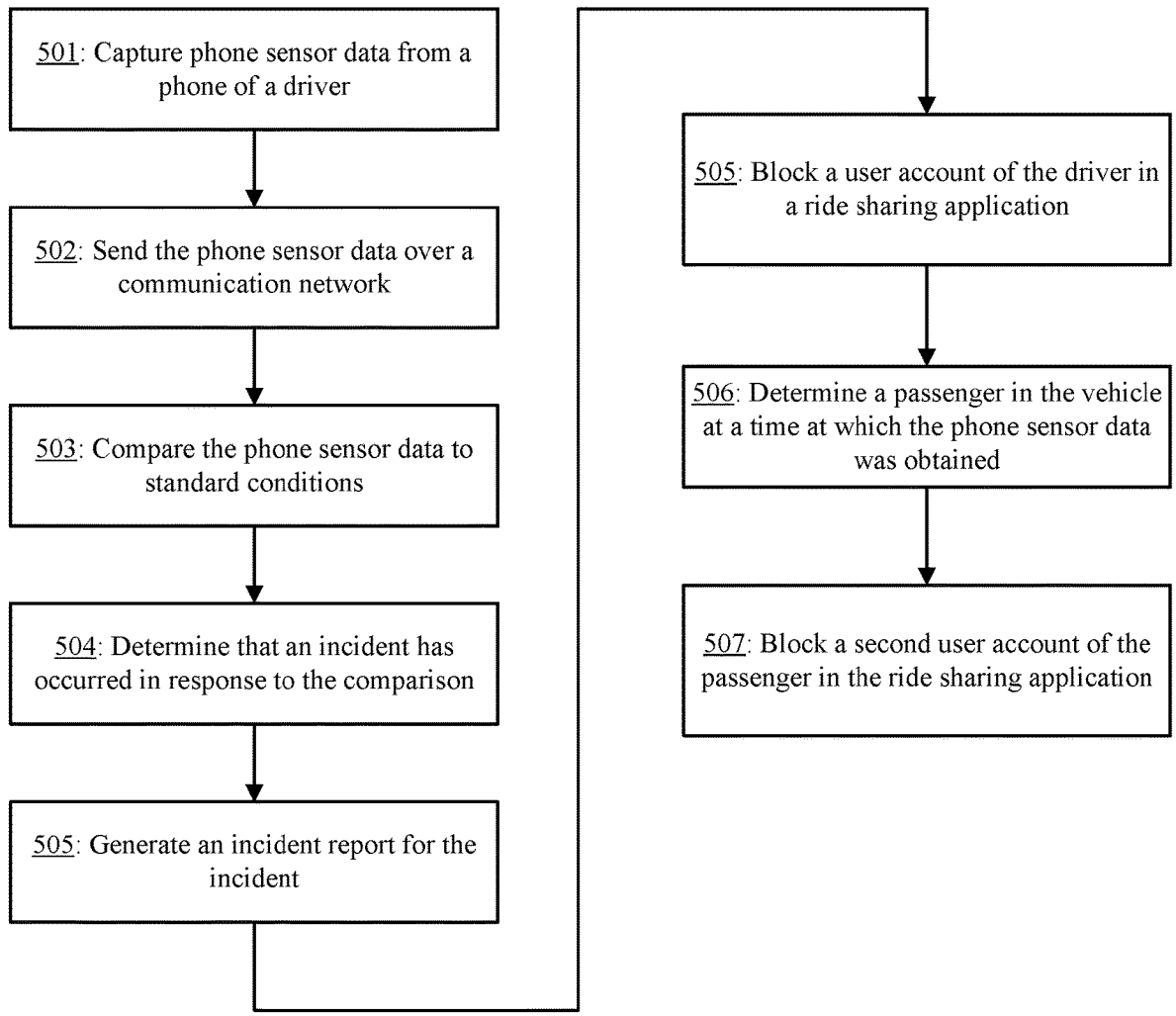
FIG. 5 illustrates a flowchart of an example method for detecting an incident, according to various embodiments of the present disclosure.

FIG. 5 illustrates a flowchart of an example method 500 for detecting an incident, according to various embodiments of the present disclosure. The method 500 may be implemented in various environments including, for example, the environment 100 of FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 501, phone sensor data may be captured from a phone of a driver. At block 502, the phone sensor data may be sent over a communication network. At block 503, the phone sensor data may be compared to standard conditions. At block 504, it may be determined that an incident has occurred in response to the comparison. At block 505, an incident report may be generated for the incident. At block 506, a user account of the driver in a ride sharing application may be blocked. In some embodiments, blocking the user account of the driver may prevent the driver from appearing to riders in the ride sharing application. In some embodiments, blocking a user account may suspend or cancel the user account. At block 507, it may be determined that a passenger was in the vehicle at a time at which the phone sensor data was obtained. At block 508, a second user account of the passenger in the ride sharing application may be blocked.

Figure 6:
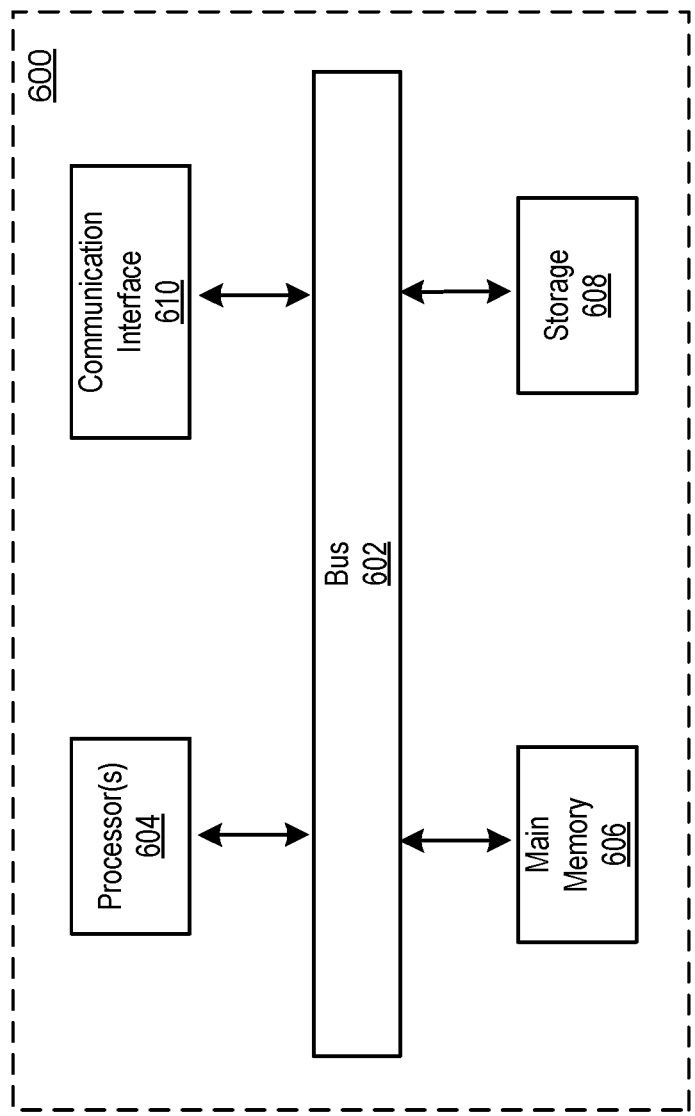
FIG. 6 is a block diagram that illustrates a computer system upon which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein.

For example, The computing system 600 may be used to implement the computing system 102, the cloud service 104, and the hotspot device 106 shown in FIG. 1. As another example, the processes/methods shown in FIGS. 2-5 and described in connection with this figure may be implemented by computer program instructions stored in main memory 606. When these instructions are executed by processor(s) 604, they may perform the steps as shown in FIGS. 2-5 and described above. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system comprising:
   one or more processors; and
   memory storing instructions that, when executed by the one or more processors, cause the system to perform:
      receiving, over a communication network, trigger data from a trigger device in a vehicle,
         wherein the trigger data comprises a phrase set by a driver or a phrase associated with a crime, and
         wherein content of the phrase is recognized based on a speech analysis technique;
      generating an incident report based on the trigger data, the incident report comprising driver information of a driver of the vehicle; and
      blocking a user account of the driver in a ride sharing application.

2. The system of claim 1, wherein the trigger device comprises a phone of the driver of the vehicle.

3. The system of claim 2, wherein the trigger data comprises phone sensor data from the phone of the driver.

4. The system of claim 3, wherein generating an incident report based on the trigger data comprises:
   comparing the phone sensor data to standard conditions;
   determining, in response to the comparison, that an incident has occurred; and
   generating the incident report for the incident.

5. The system of claim 1, wherein the trigger data comprises an activation or deactivation of the trigger device.

6. The system of claim 1, wherein blocking the user account of the driver prevents the driver from appearing to riders in the ride sharing application.

7. The system of claim 1, wherein the instructions further cause the system to perform:
   determining that a passenger was in the vehicle at a time at which the trigger data was obtained; and
   blocking a second user account of the passenger in the ride sharing application.

8. The system of claim 1,
   wherein the trigger device is disposed within a first area of the vehicle that is invisible to a passenger of the vehicle; and
   wherein the instructions further cause the system to perform:
      controlling a camera disposed within a second area of the vehicle over the communication network in response to receiving the trigger data, the controlling causing the camera to capture sensor information of the passenger of the vehicle;
      determining passenger information of the passenger of the vehicle in response to receiving the trigger data; and
      generating an alert notification, the alert notification comprising at least a portion of the sensor information of the passenger information, the alert notification being capable of initiating one or more incident actions associated with the passenger.

9. A method, comprising:
   receiving, over a communication network, trigger data from a trigger device in a vehicle,
      wherein the trigger data comprises a phrase set by a driver or a phrase associated with a crime, and
      wherein content of the phrase is recognized based on a speech analysis technique;
   generating an incident report based on the trigger data, the incident report comprising driver information of a driver of the vehicle; and
   blocking a user account of the driver in a ride sharing application.

10. The method of claim 9, wherein the trigger device comprises a phone of the driver of the vehicle.

11. The method of claim 10, wherein the trigger data comprises phone sensor data from the phone of the driver.

12. The method of claim 11, wherein generating an incident report based on the trigger data comprises:
    comparing the phone sensor data to standard conditions;
    determining, in response to the comparison, that an incident has occurred; and
    generating the incident report for the incident.

13. The method of claim 9, wherein the trigger data comprises an activation or deactivation of the trigger device.

14. The method of claim 9, wherein blocking the user account of the driver prevents the driver from appearing to riders in the ride sharing application.

15. The method of claim 9, wherein the instructions further cause the system to:
    determining that a passenger was in the vehicle at a time at which the trigger data was obtained; and
    blocking a second user account of the passenger in the ride sharing application.

16. The method of claim 9, wherein the trigger device is disposed within a first area of the vehicle that is invisible to a passenger of the vehicle, further comprising:
    controlling a camera disposed within a second area of the vehicle over the communication network in response to receiving the trigger data, the controlling causing the camera to capture sensor information of the passenger of the vehicle;

determining passenger information of the passenger of the vehicle in response to receiving the trigger data; and generating an alert notification, the alert notification comprising at least a portion of the sensor information of the passenger, the alert notification being capable of initiating one or more incident actions associated with the passenger.

17. A non-transitory computer-readable storage medium configured with instructions executable by one or more processors to cause the one or more processors to perform operations comprising:

receiving, over a communication network, trigger data from a trigger device in a vehicle wherein the trigger data comprises a phrase set by a driver or a phrase associated with a crime, and wherein content of the phrase is recognized based on a speech analysis technique;

generating an incident report based on the trigger data, the incident report comprising driver information of a driver of the vehicle; and blocking a user account of the driver in a ride sharing application.

18. The non-transitory computer-readable storage medium of claim 17, wherein the trigger device comprises a phone of the driver of the vehicle.

19. The non-transitory computer-readable storage medium of claim 18, wherein the trigger data comprises phone sensor data from the phone of the driver.

20. The non-transitory computer-readable storage medium of claim 19, wherein generating an incident report based on the trigger data comprises:

comparing the phone sensor data to standard conditions;

determining, in response to the comparison, that an incident has occurred; and generating the incident report for the incident.

\* \* \* \* \*

UNITED STATES PATENT AND TRADEMARK OFFICE
CERTIFICATE OF CORRECTION

PATENT NO. : 11,089,451 B2  
APPLICATION NO. : 16/717983  
DATED : August 10, 2021  
INVENTOR(S) : Li et al.

Page 1 of 1

It is certified that error appears in the above-identified patent and that said Letters Patent is hereby corrected as shown below:

In the Claims

In Claim 17, Column 13, Line 14, "from a trigger device in a vehicle wherein the trigger" should read --from a trigger device in a vehicle, wherein the trigger--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*